Patented Apr. 4, 1939

2,152,917

UNITED STATES PATENT OFFICE 2,152,917

SILICATE-CONTAINING PRODUCTS AND PROCESSES OF MAKING

Sverre Quisling, Madison, Wis.

No Drawing. Application May 7, 1935, Serial No. 20,189

8 Claims. (Cl. 106—30)

This invention relates to silicate-containing products and to processes of making them and is herein illustrated as applied to products made with sodium silicate or water glass.

Silicate-containing products are often transparent, and often present an attractive appearance when fresh, and have some other good qualities, but the products often are brittle, deteriorate on standing, are hygroscopic or efflorescent, and have other defects when used as coatings, one defect being lack of flexibility.

Some coatings crack as they dry and become brittle and usually are neither greaseproof nor waterproof. What is said about coatings applies, often in large degrees, to films.

According to the present invention these and other difficulties are overcome, and new fields of usefulness are opened.

Other features and advantages will hereinafter appear.

One composition was made as follows:

A silicate of soda having an alkali to silica ratio of 1:1.58, in the concentration of about 59° Baumé in the form of a syrupy liquid was diluted with an equal amount of water. To this solution was added one-fourth volume of a solution containing equal parts of diethylene oxide, such as that known to the trade as "Dioxan", and carbolic acid and the resulting solution agitated. After quiescence, acetone was added and the mass agitated until the coagulated mass became very viscous. The supernatant liquid was then poured off. This viscous plastic mass could be kneaded with the fingers and would not adhere to the fingers if they had been previously oiled. The plastic mass could be further hardened by further treatment with acetone or alcohol and then kneading. It was found that only a slight amount of such acetone or alcohol was taken up by the plastic mass.

This mass was squeezed and kneaded into sheets which dried off in an hour or more. The dried sheets were fairly transparent, and fairly flexible when less than $\frac{1}{16}$ inch thick, or even when thicker. The sheets cracked only when bent sharply, and at the end of two weeks retained these properties fairly well. They were more stable and more water resistant when treated with the various baths described below.

A more flexible product and more stable was obtained when a small amount of plasticizer camphor, about 5% of the total, was added to the diethylene oxide and carbolic acid before mixing with the silicate.

Naphthalene, when substituted for camphor, gave an apparently more stable product, and, moreover, naphthalene concealed any odor of carbolic acid.

The film was fire resistant, swelling under a flame to a white opaque mass.

A less alkaline silicate of soda, having an alkali to silica ratio of 1:2 in the concentration of about 69° Baumé, was diluted with an equal amount of water. The resulting solution was mixed with about one-fourth volume of the carbolic acid to form a gummy mass. This mass was workable by adding an amount of acetone, a small amount more than the added carbolic acid. In other ways also this silicate worked like that described above.

The same types of silicate of soda were also diluted with an equal quantity of water. Phenol crystals and naphthalene were heated together to form a liquid which was poured into the diluted silicate of soda, sometimes less than 10%, yielding a plastic mass rollable into a film, after pouring off the supernatant liquid. Better results were obtained by first dissolving the mixed phenol and naphthalene in alcohol. Phenol was highly effective in increasing transparency of the films and making the films less sticky. Cresol and guaiacol had the same effect but to a less degree. Pine oil instead of the naphthalene or part of the naphthalene was useful.

These films were somewhat soluble in water but alum and calcium fluoride and other baths mentioned below, made them less soluble.

Similar films and plastic bodies though not so transparent were made by substituting other resins for gum camphor, such as vinyl resin, gum guiac, gum benzoin and common rosin. Solutions of these were successfully combined with large amounts of silicate, sometimes with more than ten times their weight of silicate, which product proved relatively water-resistant.

All these products were made much more water-resistant by dipping in a bath containing a strong solution of calcium chloride in water to which had been later added an equal amount of ethyl alcohol. Instead of calcium chloride it was found possible to use ammonia alum. Powdered calcium fluoride stirred up in water and mixed with an equal amount of alcohol also made an excellent bath.

To coagulate the colloidal sodium silicate, it was found possible to substitute for the ethyl alcohol some ketones such as acetone, and diethylene oxide. The ethylene glycol monomethyl ether could also be substituted.

A cellulose ester-containing bath was made as follows; cellulose nitrate was dissolved in acetone or other ketone or ether solvent, to form a solution containing about 3% or 5% cellulose nitrate, and the water-soluble film dipped in the bath.

The coated film was then found to be water-resistant, fire-resistant, transparent and flexible.

Similar results were obtained using a bath where cellulose acetate was substituted for the nitrate.

Another bath was made by dissolving 5% vinyl resin in acetone. Water-soluble films dipped in this bath became water insoluble, and were fire-resistant.

It was found possible to make successful baths of mixtures of the above-mentioned esters and the vinyl resin.

Another bath was made by dissolving beeswax in a mixture of acetone and petroleum benzine. This bath successfully coated the water-soluble films. Ceresine or tallow could be substituted for the wax, and other organic solvents used in making these baths. Films coated with these baths resisted the action of water.

Cellulose acetate was dissolved in acetone, and mixed with an equal amount of a solution of diethylene oxide with an equal amount of a strong aqueous solution of powdered silicate of soda obtained by dissolving as much powder as would dissolve in boiling water and decanting this supernatant liquid. The powder silicate of soda of an alkali to silica ratio of 1:2 was found particularly satisfactory. To this whole mixture was added about one fourth as much of a mixture of equal parts of diethylene oxide and benzole. The resultant mixture was then stirred and to this was added a 20% solution of calcium chloride dissolved in a solution containing equal parts of water and diethylene oxide, the added solution equalling 10% of the total mixture. To this was added a diethylene oxide solution of camphor and phenol sufficient to introduce 3% of camphor and phenol. A film equally good, except that it was less water-resistant, was obtained when the calcium chloride was omitted.

The calcium chloride-containing solution produced a transparent, strong flexible film when poured out on glass and allowed to dry. The solution when poured into water formed a plastic moldable mass. Also a strong fire-resistant transparent flexible film was found after half an hour on the surface of previously dried adherent colloidal sodium silicate on the bottom of the beaker into which the water had been poured.

A film sticky when moistened with water was made by mixing an acetone solution of acetyl cellulose with an equal volume of equal parts of diethylene oxide and aqueous solution of silicate of soda. To this was added one fourth its weight of diethylene oxide and acetone, and then was added 3% to 5% of Lysol, and the mixture poured out to dry. When dry the film was strong and transparent.

It was found that a composition having almost all the elasticity of a vinyl resin-cellulose ester mixture is obtained when part or all of the ester is replaced by a suitable silicate of soda.

A plastic, elastic, transparent, water-resistant material was made by dissolving a polymerized vinyl acetate resin, such as known to the trade as "Vinyloid A" in a mixture of 85% acetone and 15% isopropanol, so as to contain about 5% of the resin. To this was added an equal amount of a solution containing 3% sodium silicate powder of an alkali to silica ratio of 1:2, dissolved in water to which had later been added an equal quantity of diethylene oxide.

The mixture was well stirred and when poured on a glass and allowed to dry, formed a film which was uneven. Another lot which was poured into water formed a gummy precipitate, rolled out and kneaded to form a film. Both films were transparent. Threads made both ways were also elastic, resembling rubber. The products were both water-resistant and unburnable. A film which was relatively plastic for a day but then became strong and elastic was made by substituting a solution of cellulose acetate for a quarter to half the initial solution of silicate of soda.

Vinyl resin films containing cellulose ester were extraordinarily transparent and flexible when they contained a plasticizer such as phenol, or benzole with phenol, or some other plasticizers.

Cellulose nitrate was found capable of being used instead of part or all of the cellulose acetate where that was used in any of the preceding compositions.

Some of the solutions were capable of use as cloth or other sizing agents, others formed adherent films on cloth or paper. For such purposes it was possible to eliminate odor where objectionable by substituting odorless plasticizers, petroleum benzine, or benzole for the phenol or other hydroxy aromatic compound.

The plasticizer, methylphthalylethyl-glycolate, was useful as a substitute for phenol.

According to the present invention a salt in aqueous solution if mixed with equal parts or more of a ketone or ether may be added to a solution of an ester or resin in a ketone or alcohol or ether without precipitation of the ester or resin.

This was true if phosphate of soda or sulphate of soda or carbonate of soda was substituted for the silicate. The same was true of the organic salts sodium acetate, sodium citrate, sodium salicylate and sodium benzoate.

Having thus described my invention what I claim is:

1. The process which includes mixing a solution of sodium silicate having an alkali to silica ratio of from 1:1.58 to 1:2 with diethylene oxide solution of phenol, adding acetone to the resulting solution so as to form a plastic and separating the product.

2. The product made by the process which includes mixing a solution of sodium silicate having an alkali to silica ratio of from 1:1.58 to 1:2 with diethylene oxide solution of phenol, and adding acetone to the resultant solution.

3. The process which includes mixing a solution of sodium silicate having an alkali to silica ratio of from 1:1.58 to 1:2 with a solution including phenol and diethylene oxide, adding acetone to the resulting solution so as to form a plastic and separating the product.

4. The product made by the process which includes mixing a solution of sodium silicate having an alkali to silica ratio of from 1:1.58 to 1:2 with a solution including diethylene oxide and phenol, and adding acetone to the resultant solution.

5. The process which includes mixing a solution of sodium silicate having an alkali to silica ratio of from 1:1.58 to 1:2 with a solution containing phenol, and adding acetone to the resultant solution to form a plastic mass and separating the product.

6. The product made by the process which includes mixing a solution of sodium silicate having an alkali to silica ratio of from 1:1.58 to 1:2 with a solution containing phenol, and adding acetone to the resultant solution.

7. The process which includes mixing a solution of sodium silicate having an alkali to silica ratio of from 1:1.58 to 1:2 with a solution including diethylene oxide and at least one of the group aromatic-hydroxy compounds, phenol, cresol, or guiacol, and adding at least one of the organic solvent group, diethylene oxide, ethylene glycol-monomethyl ether, alcohol, and acetone, to the resultant solution and separating the product.

8. The product of the process which includes mixing a solution of sodium silicate having an alkali to silica ratio of from 1:1.58 to 1:2 with a solution including diethylene oxide and at least one of the group aromatic-hydroxy compounds, phenol, cresol, or guiacol, and adding at least one of the organic solvent group, diethylene oxide, ethylene glycol-monomethyl ether and alcohol, and acetone, to the resultant solution and separating the product.

SVERRE QUISLING.